United States Patent
Liu

(10) Patent No.: US 12,010,166 B2
(45) Date of Patent: Jun. 11, 2024

(54) METHOD AND SYSTEM FOR RESOURCE EXPOSURE IN KUBERNETES, AND DEVICE AND MEDIUM

(71) Applicant: INSPUR SUZHOU INTELLIGENT TECHNOLOGY CO., LTD., Suzhou (CN)

(72) Inventor: Peng Liu, Suzhou (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/013,108

(22) PCT Filed: May 27, 2021

(86) PCT No.: PCT/CN2021/096544
§ 371 (c)(1),
(2) Date: Dec. 27, 2022

(87) PCT Pub. No.: WO2022/033121
PCT Pub. Date: Feb. 17, 2022

(65) Prior Publication Data
US 2023/0319132 A1    Oct. 5, 2023

(30) Foreign Application Priority Data
Aug. 14, 2020 (CN) .......................... 202010818535.5

(51) Int. Cl.
*H04L 67/1008* (2022.01)
*H04L 61/45* (2022.01)

(52) U.S. Cl.
CPC .......... *H04L 67/1008* (2013.01); *H04L 61/45* (2022.05)

(58) Field of Classification Search
None
See application file for complete search history.

(56) References Cited

U.S. PATENT DOCUMENTS

| 7,269,603 | B1 * | 9/2007 | Dewan | H04L 67/51 |
| 2006/0182123 | A1 * | 8/2006 | Monette | H04L 67/63 |
| | | | | 370/352 |

(Continued)

FOREIGN PATENT DOCUMENTS

| CN | 107864131 A | 3/2018 |
| CN | 110086726 A | 8/2019 |

(Continued)

OTHER PUBLICATIONS

International search report for PCT/CN2021/096544 dated Jul. 30, 2021.

(Continued)

*Primary Examiner* — Scott B Christensen
(74) *Attorney, Agent, or Firm* — Dennemeyer & Associates LLC; Victoria Friedman

(57) ABSTRACT

Disclosed is a method for resource exposure in kubernetes, including: in response to receiving a request for applying for a service resource, judging whether a mapping relationship between a label corresponding to a type of the service resource and virtual IPs exists in a first configuration file of a keepalived service; in response to absence of the mapping relationship, acquiring new virtual IPs and establishing, in the first configuration file, a mapping relationship between the new virtual IPs and the label; and binding the virtual IPs corresponding to the label in the first configuration file to a plurality of pods corresponding to the service resource, so as to expose the plurality of the pods outside a kubernetes cluster by the virtual IP. Further disclosed are a system, a computer device and a readable storage medium.

17 Claims, 2 Drawing Sheets

(56) References Cited

U.S. PATENT DOCUMENTS

2019/0379590 A1 12/2019 Rimar et al.
2021/0243164 A1* 8/2021 Murray ............... H04L 61/4511

FOREIGN PATENT DOCUMENTS

| CN | 111343007 A | 6/2020 |
| CN | 112003961 A | 11/2020 |

OTHER PUBLICATIONS

Search report for Chinese application No. 202010818535.5 filed on Aug. 14, 2020.

* cited by examiner

METHOD AND SYSTEM FOR RESOURCE EXPOSURE IN KUBERNETES, AND DEVICE AND MEDIUM

CROSS-REFERENCE TO RELATED APPLICATION

The present application claims priority to a patent application no. 202010818535.5 filed to the China National Intellectual Property Administration on Aug. 14, 2020 and entitled "Method and System for Resource Exposure in Kubernetes, and Device and Medium", which is incorporated herein by reference in its entirety.

FIELD

The present disclosure relates to the field of kubernetes, and in particular, to a method and system for resource exposure in kubernetes, and a device and a medium.

BACKGROUND

In kubernetes (K8s, which is an open-source application for managing containerization on a plurality of hosts in a cloud platform), multiple methods for external exposure services are provided, for example, nodeport, L7ingress, and L4 LoadBalancer (three external access methods of kubernetes). However, these methods are based on a domain name system (DNS), and thus do not provide true high availability (HA) of multiple replicas of a pod (the minimal management element in kubernetes). The main reason for this problem is that, in the multi-replica pod, when a certain replica goes down, the DNS does not sense that an anomalous pod occurs, and still imports some traffic into the anomalous pod, and does not stop importing a part of the traffic into the anomalous pod until the DNS finds that the pod is anomalous and corrects the traffic direction.

SUMMARY

In view of this, an embodiment of the present disclosure provides a method for resource exposure in kubernetes, including the following steps:
  in response to receiving a request for applying for a service resource, whether a mapping relationship between a label corresponding to a type of the service resource and virtual Internet Protocols (IPs) exists in a first configuration file of a keepalived (a software capable of realizing a highly-available solution) service is judged;
  in response to absence of the mapping relationship, new virtual IPs are acquired and a mapping relationship between the new virtual IPs and the label is established in the first configuration file; and
  the virtual IPs corresponding to the label in the first configuration file are bound to a plurality of pods corresponding to the service resource, so as to expose the plurality of pods outside a kubernetes cluster by the virtual IP.
In some embodiments, the virtual IPs corresponding to the label in the first configuration file are bound to the plurality of the pods corresponding to the service resource includes:
  the plurality of the pods corresponding to the service resource are created;
  the IPs of the plurality of the pods which are created are updated into a pod list;
  the pod list is monitored by the keepalived service, to update the IPs of the plurality of the pods which are created into a load configuration file; and
  a load balancing policy is executed on a basis of number of the plurality of the pods, corresponding to the service resource, in the load configuration file.
In some embodiments, the method further includes:
  in response to several pods among the plurality of the pods corresponding to the service resource being anomalous, the IPs of the several pods being anomalous are deleted from the pod list; and
  the keepalived service detecting that the IPs of the several pods in the pod list are deleted, deleting the IPs of the several pods correspondingly in the load configuration file, and executing a load balancing policy on a basis of number of remaining pods of the service resource in the load configuration file.
In some embodiments, the method further includes:
  in response to existence of the mapping relationship, whether a request for disconnecting the mapping relationship is received is judged; and
  in response to receiving the request for disconnecting the mapping relationship, the mapping relationship is deleted from the first configuration file, and the plurality of the pods corresponding to the service resource is unbound with the virtual IPs correspondingly, so as to expose the plurality of the pods outside the kubernetes cluster by means of a native method of the kubernetes cluster.
In some embodiments, in response to the absence of the mapping relationship, the new virtual IPs are acquired, and the mapping relationship between the new virtual IPs and the label is established in the first configuration file further includes:
  in response to the absence of the mapping relationship, whether a request for establishing the mapping relationship is received is judged; and
  in response to receiving the request for establishing the mapping relationship, the new virtual IPs are acquired, and the mapping relationship between the new virtual IPs and the label is established in the first configuration file.
In some embodiments, the method further includes:
  in response to a request for establishing the mapping relationship being not received, the plurality of the pods are exposed outside the kubernetes cluster by a native method of the kubernetes cluster.
In some embodiments, the method further includes:
  the load balancing policy is modified by means of the first configuration file.
Based on the same inventive concept, according to another aspect of the present disclosure, an embodiment of the present disclosure further provides a system for resource exposure in kubernetes, including:
  a judging component configured to judge, in response to receiving a request for applying for a service resource, whether a mapping relationship between a label corresponding to a type of the service resource and virtual IPs exists in a first configuration file of a keepalived service;
  an acquisition component configured to acquire, in response to absence of the mapping relationship, new virtual IPs and establish, in the first configuration file, a mapping relationship between the new virtual IPs and the label; and
  a binding component configured to bind the virtual IPs corresponding to the label in the first configuration file to a plurality of pods corresponding to the service resource, so as to expose the plurality of the pods outside a kubernetes cluster by the virtual IP.

Based on the same inventive concept, according to another aspect of the present disclosure, an embodiment of the present disclosure further provides a computer device, including:

at least one processor; and a memory, storing a computer instruction executable on the at least one processor, and the computer instruction, when being executed by the at least one processor, implements operation of the steps of any described method for resource exposure in the kubernetes.

Based on the same inventive concept, according to another aspect of the present disclosure, an embodiment of the present disclosure further provides a computer readable storage medium storing a computer program, and when the computer program is executed by at least one processor, operations of the steps of any one of the described methods for resource exposure in the kubernetes are implemented.

BRIEF DESCRIPTION OF THE DRAWINGS

In order to describe the technical solutions in the embodiments of the present disclosure or in the prior art more clearly, hereinafter, the accompanying drawings requiring to be used for describing the embodiments or the prior art are introduced briefly. Apparently, the accompanying drawings in the following description merely relate to some embodiments of the present disclosure, and for a person of ordinary skill in the art, other accompanying drawings may also be derived from these accompanying drawings without involving any inventive effort.

DETAILED DESCRIPTION

To make the objectives, technical solutions, and advantages of the present disclosure clearer, hereinafter, the embodiments of the present disclosure is further described in detail by taking embodiments as examples and referring to the accompanying drawings.

It should be noted that expressions "first" and "second" used in the embodiments of the present disclosure are used to distinguish two entities or parameters which have the same name but are not the same one. It may be seen that "first" and "second" are merely for convenience of expression, and should not be understood as limiting the embodiments of the present disclosure. It will not be described in detail hereinafter.

Figure 1:
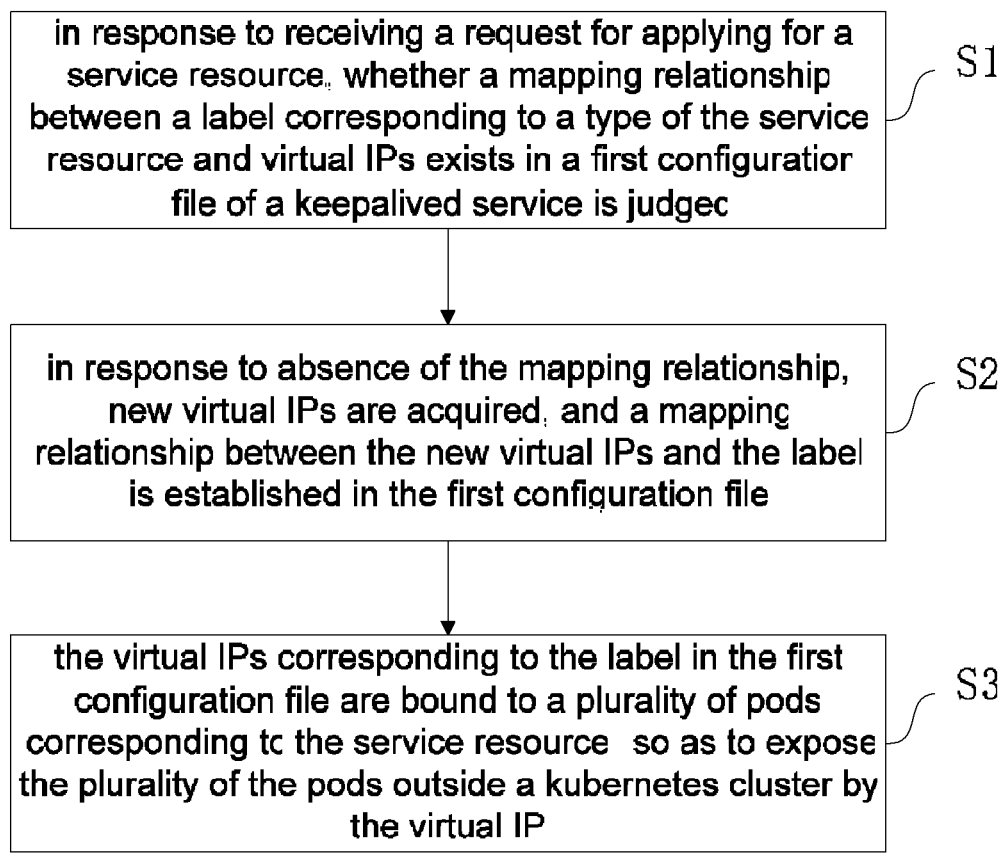
FIG. 1 is a schematic flowchart of a method for resource exposure in kubernetes according to an embodiment of the present disclosure.

According to one aspect of the present disclosure, an embodiment of the present disclosure provides a method for resource exposure in kubernetes. As shown in FIG. 1, the method may include the following steps:

S1, in response to receiving a request for applying for a service resource, whether a mapping relationship between a label corresponding to a type of the service resource and virtual IPs exists in a first configuration file of a keepalived service is judged;

S2, in response to absence of the mapping relationship, new virtual IPs are acquired, and a mapping relationship between the new virtual IPs and the label is established in the first configuration file; and S3, the virtual IPs corresponding to the label in the first configuration file are bound to a plurality of pods corresponding to the service resource, so as to expose the plurality of the pods outside a kubernetes cluster by the virtual IP.

In the solution provided by the present disclosure, the virtual IP (VIP) is mapped to each pod of the service resource by means of keepalived, and the VIP is exposed outside the kubernetes cluster, so that each pod of the service resource is exposed outside the kubernetes cluster, and the problem of service interruption caused by a DNS is avoided.

In some embodiments, the virtual IPs corresponding to the label in the first configuration file are bound to the plurality of the pods corresponding to the service resource includes:

the plurality of the pods corresponding to the service resource are created;

the IPs of the plurality of the pods which are created are updated into a pod list;

the pod list is monitored by the keepalived service, to update the IPs of the plurality of the pods which are created into a load configuration file; and a load balancing policy is executed on a basis of number of the plurality of the pods, corresponding to the service resource, in the load configuration file.

According to an embodiment of this disclosure, when the plurality of the pods are used to create the service resource in a kubernetes cluster, the kubernetes cluster may add the IPs of the plurality of the pods which are created to the pod list, and the kubernetes cluster may provide an interface, so that other services may obtain pod information on the pod list; therefore, the keepalived service may obtain the pod information on the pod list by means of the interface. In this way, when it is detected that the pod information on the pod list changes, whether the service resource corresponding to the changed pod information is a designated service resource may judged, and if the service resource corresponding to the changed pod information is the designated service resource, the IPs of the corresponding plurality of pods to are added to the load configuration file, so as to execute the load balancing policy on the basis of the number of the plurality of the pods, corresponding to the service resource, in the load configuration file.

In some embodiments, the method further includes:

in response to several pods among the plurality of the pods corresponding to the service resource being anomalous, the IPs of the several pods being anomalous are deleted from the pod list; and the keepalived service detecting that the IPs of the several pods in the pod list are deleted, deleting the IPs of the several pods correspondingly in the load configuration file, and executing a load balancing policy on a basis of number of remaining pods of the service resource in the load configuration file.

According to an embodiment of this disclosure, when the keepalived service detects that the IPs of the several pods in the pod list are deleted, if there are IPs of several corresponding pods in the load configuration file, the IPs of the several corresponding pods in the load configuration file are also deleted, and the load balancing policy is executed on the basis of the number of remaining pods of the service resource in the load configuration file. Likewise, if it is detected that the IPs of the several pods in the pod list are increased and the increased IPs of the pod belong to a designated service resource, the increased IPs of the several pods are added to the load configuration file, and the load balancing policy is executed on the basis of the number of remaining pods of the service resource in the load configuration file.

It should be noted that, as long as the keepalived service monitors the pod of the designated service resource, no matter whether the user laterally expands or contracts the service resource, the load configuration file of the keepalived service will be modified synchronously; if the user deletes the service resource, the user will delete the pod in the load configuration file of the keepalived synchronously.

In some embodiments, in step S1, in response to receiving the request for applying for the service resource, whether the mapping relationship between the label corresponding to the type of the service resource and the virtual IPs exists in the first configuration file of the keepalived service is judged, specifically, when a user applies for the service resource in the kubernetes cluster, it is judged, by means of the first configuration file of the keepalived service, whether the mapping relationship is established between the service resource and the virtual IPs (VIPs); and if the mapping relationship does not exist, step S2 is executed.

In some embodiments, step S2, in response to the absence of the mapping relationship, the new virtual IPs are acquired, and the mapping relationship between the new virtual IPs and the label is established in the first configuration file further include:

in response to the absence of the mapping relationship, whether a request for establishing the mapping relationship is received is judged; and in response to receiving the request for establishing the mapping relationship, the new virtual IPs are acquired, and the mapping relationship between the new virtual IPs and the label is established in the first configuration file.

In some embodiments, the method further includes:

in response to a request for establishing the mapping relationship being not received, the plurality of the pods are exposed outside the kubernetes cluster by a native method of the kubernetes cluster.

According to an embodiment of this disclosure, if there is no mapping relationship in the first configuration file, a corresponding mapping relationship may be requested to be established, that is, a new virtual IP may be acquired, and then a mapping relationship between the virtual IP and the service resource is established. It may also not be requested to establish a corresponding mapping relationship, and the plurality of the pods are exposed outside the kubernetes cluster by the native method of the kubernetes cluster.

It should be noted that, if the corresponding mapping relationship is requested to be established, the plurality of the pods may be exposed outside the kubernetes cluster by a VIP method, and it may coexist with the method of exposing the plurality of the pods outside the kubernetes cluster, that is, a user may access a corresponding service resource by means of VIP, and may also access a corresponding service resource by a native method.

In some embodiments, the method further includes:

in response to existence of the mapping relationship, whether a request for disconnecting the mapping relationship is received is judged; and in response to receiving the request for disconnecting the mapping relationship, the mapping relationship is deleted from the first configuration file, and the plurality of the pods corresponding to the service resource is unbound with the virtual IPs correspondingly, so as to expose the plurality of the pods outside the kubernetes cluster by means of a native method of the kubernetes cluster.

According to an embodiment of this disclosure, if there is a mapping relationship, the mapping relationship may also be requested to be disconnected, and the plurality of the pods are exposed outside the kubernetes cluster by a method for exposing the pods using the native method of the kubernetes cluster.

In some embodiments, the method further includes:

the load balancing policy is modified by means of the first configuration file.

According to an embodiment of this disclosure, the user may modify the load balancing configuration policy of the service in the first configuration file, and execute the load balancing policy on the basis of the number of the plurality of the pods, corresponding to the service resource, in the load configuration file.

In the solution provided by the present disclosure, the virtual IP (VIP) is mapped to each pod of the service resource by means of keepalived, and the VIP is exposed outside the kubernetes cluster, so that each pod of the service resource is exposed outside the kubernetes cluster, and the problem of service interruption caused by a DNS is avoided.

Figure 2:
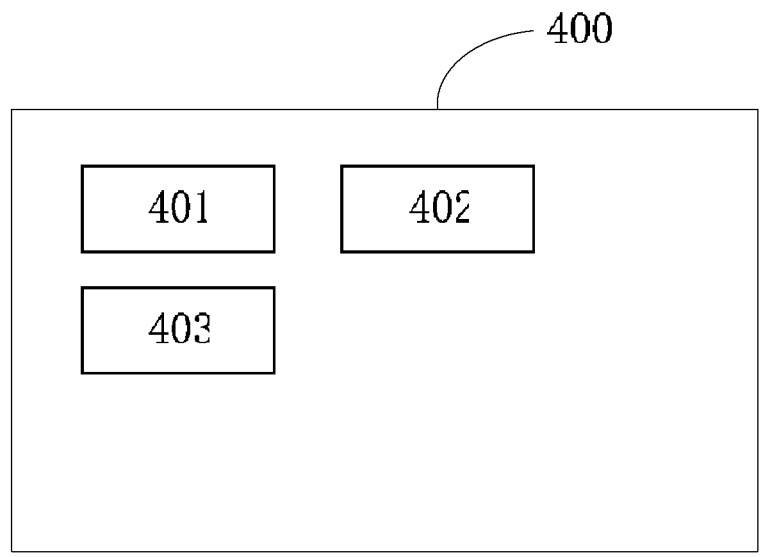
FIG. 2 is a schematic structural diagram of a system for resource exposure in kubernetes according to an embodiment of the present disclosure.

Based on the same inventive concept, according to another aspect of the present disclosure, an embodiment of the present disclosure further provides a system 400 for resource exposure in kubernetes, as shown in FIG. 2, including:

a judging component 401 configured to judge, in response to receiving a request for applying for a service resource, whether a mapping relationship between a label corresponding to a type of the service resource and virtual IPs exists in a first configuration file of a keepalived service;

an acquisition component 402 configured to acquire, in response to absence of the mapping relationship, new virtual IPs and establish, in the first configuration file, a mapping relationship between the new virtual IPs and the label; and a binding component 403 configured to bind the virtual IPs corresponding to the label in the first configuration file to a plurality of pods corresponding to the service resource, so as to expose the plurality of the pods outside a kubernetes cluster by the virtual IP.

Figure 3:
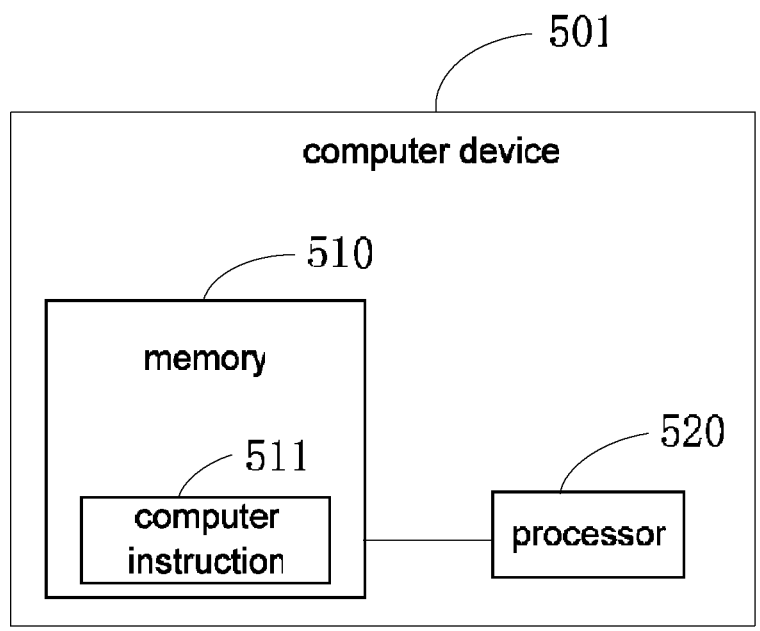
FIG. 3 is a schematic structural diagram of a computer device according to an embodiment of the present disclosure.

Based on the same inventive concept, according to another aspect of the present disclosure, as shown in FIG. 3, an embodiment of the present disclosure further provides a computer device 501, including:

at least one processor 520; and a memory 510, the memory 510 stores a computer instruction 511 instruction executable on the at least one processor, and the computer instruction, when being executed by the at least one processor 520, implements operation of the steps of any described method for resource exposure in the kubernetes are executed.

Figure 4:
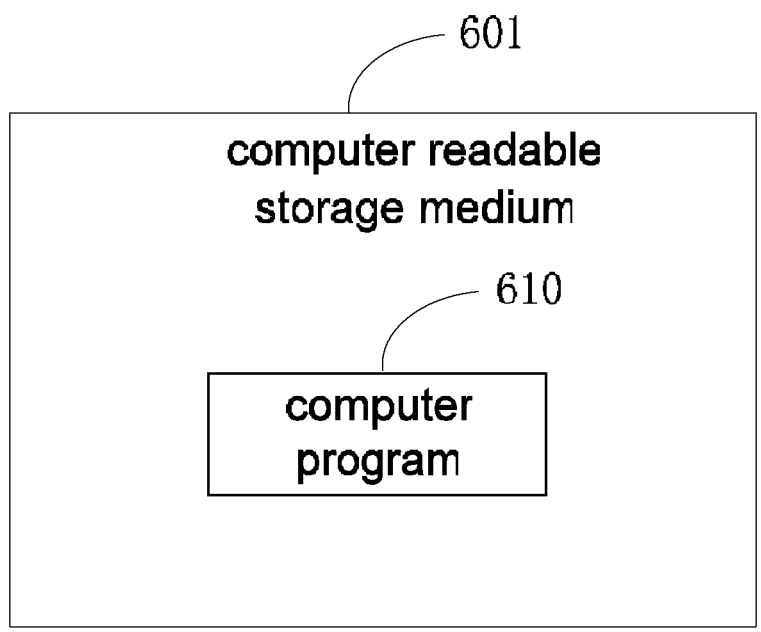
FIG. 4 is a schematic structural diagram of a computer readable storage medium according to an embodiment of the present disclosure.

Based on the same inventive concept, according to another aspect of the present disclosure, as shown in FIG. 4, an embodiment of the present disclosure further provides a computer readable storage medium 601. The computer readable storage medium 601 stores a computer program 610. When the computer program 610 is executed by at least one processor, operations of the steps of any one of the described methods for resource exposure in the kubernetes, are implemented.

Finally, it should be noted that a person of ordinary skill in the art would understand that all or some processes of the methods in the described embodiments may be completed by computer-readable instructions instructing relevant hardware. The program may be stored in a computer readable storage medium, and when the program is executed, the processes of the embodiments of the method may be included.

Furthermore, it should be appreciated that a computer-readable storage medium (e. g., memory) herein may be a volatile memory or a non-volatile memory, or may include both a volatile memory and a non-volatile memory.

It will be apparent to a person skilled in the art that the various illustrative logical blocks, components, circuits, and algorithm steps described in combination with the embodiments disclosed herein may be implemented by electronic hardware, or a combination of computer software and electronic hardware. To clearly describe the interchangeability between the hardware and the software, illustrative components, blocks, components, circuits, and steps have been described generally in terms of their functions. Whether such functions are implemented as software or hardware depends upon the particular application and design constraints imposed on the overall system. The functions may be implemented in various ways by a person skilled in the art for each particular application, but such implementation decisions should not be interpreted as causing a departure from the scope of the disclosure of embodiments of the present disclosure.

The above are exemplary embodiments of the present disclosure, but it should be noted that various changes and modifications may be made without departing from the scope of the present disclosure as defined by the claims. The functions, steps and/or actions of the method claims in accordance with the disclosed embodiments described herein need not be performed in any particular order. In addition, although elements disclosed in the embodiments of the present disclosure may be described or claimed in an individual form, unless explicitly limited to the singular, it also be understood as plural.

It should be understood that, as used herein, the singular form "a" and "an" are intended to include the plural forms as well, unless the context clearly supports the exception. It should also be understood that "and/or" as used herein refers to any and all possible combinations including one or more of the items listed in association.

The sequence number of the embodiments above of the present disclosure are only for description, but do not denote the preference of the embodiments.

A person of ordinary skill in the art would have understood that all or some of the steps for implementing the described embodiments may be implemented by hardware, and can also be implemented by programs instructing relevant hardware, the program may be stored in a computer-readable storage medium. The storage medium mentioned above may be a read-only memory, a magnetic disk, or an optical disk.

A person of ordinary skill in the art would have understood that the discussion of any embodiment is merely exemplary and is not intended to imply that the scope of the disclosure (including the claims) of the embodiments of the present disclosure is limited to these examples. Under the idea of the embodiments of the present disclosure, the technical features in the foregoing embodiments or in different embodiments may also be combined, and there are many other variations of different aspects of the foregoing embodiments of the present disclosure, which are not provided in details for simplicity. Therefore, any omissions, modifications, equivalent replacements, improvements, etc. made within the spirit and principle of the embodiments of the present disclosure shall all fall within the scope of protection of the embodiments of the present disclosure.

What is claimed is:

1. A method for resource exposure in kubernetes, comprising:
   receiving a first request for applying for a service resource, and in response to receiving the first request, judging whether a mapping relationship between a label corresponding to a type of the service resource and virtual IPs exists in a first configuration file of a keepalived service;
   receiving a second request for establishing a mapping relationship, and in response to the second request, acquiring new virtual IPs and establishing, in the first configuration file, a mapping relationship between the new virtual IPs and the label; and
   binding the virtual IPs corresponding to the label in the first configuration file to a plurality of pods corresponding to the service resource, so as to expose the plurality of the pods to entities outside of a kubernetes cluster by the virtual IP, and the plurality of the pods are part of the kubernetes cluster;
   receiving a third request indicating existence of the mapping relationship, and in response to the third request, judging whether a request for disconnecting the mapping relationship is received: and
   in response to receiving the request for disconnecting the mapping relationship, deleting the mapping relationship from the first configuration file, and unbinding the plurality of the pods corresponding to the service resource with the virtual IPs correspondingly, such that the exposing the plurality of the pods outside the kubernetes cluster is by means of a native method of the kubernetes cluster.

2. The method according to claim 1, wherein before binding the virtual IPs corresponding to the label in the first configuration file to the plurality of the pods corresponding to the service resource, the method further comprises:
   creating the plurality of the pods corresponding to the service resource;
   updating the IPs of the plurality of the pods which are created into a pod list;
   monitoring the pod list by the keepalived service, to update the IPs of the plurality of the pods which are created into a load configuration file; and
   executing a load balancing policy on a basis of number of the plurality of the pods, corresponding to the service resource, in the load configuration file.

3. The method according to claim 2, further comprising:
   modifying the load balancing policy by means of the first configuration file.

4. The method according to claim 2, wherein after executing the load balancing policy on the basis of the number of the plurality of the pods, corresponding to the service resource, in the load configuration file, the method further comprises:
   determining several pods among the plurality of the pods corresponding to the service resource are anomalous, deleting the IPs of the several pods being anomalous from the pod list; and the keepalived service detecting that the IPs of the several pods in the pod list are deleted, deleting the IPs of the several pods correspondingly in the load configuration file, and executing a load balancing policy on a basis of number of remaining pods of the service resource in the load configuration file.

5. The method according to claim 4, the method further comprising:
modifying the load balancing policy by means of the first configuration file.

6. The method according to claim 1, wherein before acquiring the new virtual IPs and establishing, in the first configuration file, the mapping relationship between the new virtual IPs and the label, the method further comprises:
determining that the mapping relationship is absent, judging whether the request for establishing the mapping relationship is received.

7. The method according to claim 6, further comprising:
determining that the request for establishing the mapping relationship being not received, exposing the plurality of the pods outside the kubernetes cluster by a native method of the kubernetes cluster.

8. A computer device, comprising:
at least one processor; and
a memory, storing a computer instruction executable on the at least one processor, wherein the computer instruction, when being executed by the at least one processor, causes the at least one processor to:
receive a first request for applying for a service resource, and in response to receiving first request, judge whether a mapping relationship between a label corresponding to a type of the service resource and virtual IPs exists in a first configuration file of a keepalived service;
receive a second request for establishing a mapping relationship, and in response to the second request, acquire new virtual IPs and establish, in the first configuration file, a mapping relationship between the new virtual IPs and the label; and
bind the virtual IPs corresponding to the label in the first configuration file to a plurality of pods corresponding to the service resource, so as to expose the plurality of the pods to entities outside of a kubernetes cluster by the virtual IP, and the plurality of the pods are part of the kubernetes cluster;
receive a third request indicating existence of the mapping relationship, and in response to the third request indicating existence of the mapping relationship, judge whether a request for disconnecting the mapping relationship is received; and
in response to receiving the request for disconnecting the mapping relationship, delete the mapping relationship from the first configuration file, and unbind the plurality of the pods corresponding to the service resource with the virtual IPs correspondingly, such that the exposing the plurality of the pods outside the kubernetes cluster by means of a native method of the kubernetes cluster.

9. The computer device according to claim 8, wherein the computer instruction, when being executed by the at least one processor, cause the at least one processor further to:
create the plurality of the pods corresponding to the service resource;
update the IPs of the plurality of the pods which are created into a pod list;
monitor the pod list by the keepalived service, to update the IPs of the plurality of the pods which are created into a load configuration file; and
execute a load balancing policy on a basis of number of the plurality of the pods, corresponding to the service resource, in the load configuration file.

10. The computer device according to claim 9, wherein the computer instruction, when being executed by the at least one processor, cause the at least one processor further to:
determine that several pods among the plurality of the pods corresponding to the service resource are anomalous, delete the IPs of the several pods being anomalous from the pod list; and
the keepalived service detects that the IPs of the several pods in the pod list are deleted, deletes the IPs of the several pods correspondingly in the load configuration file, and execute a load balancing policy on a basis of number of remaining pods of the service resource in the load configuration file.

11. The computer device according to claim 9, wherein the computer instruction, when being executed by the at least one processor, cause the at least one processor further to:
modify the load balancing policy by means of the first configuration file.

12. The computer device according to claim 10, wherein the computer instruction, when being executed by the at least one processor, cause the at least one processor further to:
modify the load balancing policy by means of the first configuration file.

13. The computer device according to claim 8, wherein the computer instruction, when being executed by the at least one processor, cause the at least one processor further to:
determine that the mapping relationship is absent, judge whether the request for establishing the mapping relationship is received.

14. The computer device according to claim 13, wherein the computer instruction, when being executed by the at least one processor, cause the at least one processor further to:
determine that the request for establishing the mapping relationship being not received, expose the plurality of the pods outside the kubernetes cluster by a native method of the kubernetes cluster.

15. A non-transitory computer readable storage medium, storing a computer program, wherein when the computer program is executed by at least one processor, the computer program is configured to cause the at least one processor to:
receive a first request for applying for a service resource, and in response to receiving the first request, judge whether a mapping relationship between a label corresponding to a type of the service resource and virtual IPs exists in a first configuration file of a keepalived service;
receive a second request for establishing a mapping relationship, and in response to the second request, acquire new virtual IPs and establish, in the first configuration file, a mapping relationship between the new virtual IPs and the label; and
bind the virtual IPs corresponding to the label in the first configuration file to a plurality of pods corresponding to the service resource, so as to expose the plurality of the pods to entities outside of a kubernetes cluster by the virtual IP, and the plurality of the pods are part of the kubernetes cluster;
receive a third request indicating existence of the mapping relationship, and in response to the third request indicating existence of the mapping relationship, judge whether a request for disconnecting the mapping relationship is received; and in response to receiving the request for disconnecting the mapping relationship, delete the mapping relationship from the first configuration file, and unbind the plurality of the pods corresponding to the service resource with the virtual IPs correspondingly, such that the exposing the plurality of the pods outside the kubernetes cluster by means of a native method of the kubernetes cluster.

16. The non-transitory computer readable storage medium according to claim 15, wherein when the computer program is executed by the at least one processor, the computer program is further configured to cause the at least one processor to:

create the plurality of the pods corresponding to the service resource;

update the IPs of the plurality of the pods which are created into a pod list;

monitor the pod list by the keepalived service, to update the IPs of the plurality of the pods which are created into a load configuration file; and execute a load balancing policy on a basis of number of the plurality of the pods, corresponding to the service resource, in the load configuration file.

17. The non-transitory computer readable storage medium according to claim 16, wherein when the computer program is executed by the at least one processor, the computer program is further configured to cause the at least one processor to:

determine that several pods among the plurality of the pods corresponding to the service resource are anomalous, delete the IPs of the several pods being anomalous from the pod list; and the keepalived service detects that the IPs of the several pods in the pod list are deleted, deleting the IPs of the several pods correspondingly in the load configuration file, and executes a load balancing policy on a basis of number of remaining pods of the service resource in the load configuration file.

* * * * *